United States Patent
Youn et al.

(10) Patent No.: US 11,154,167 B2
(45) Date of Patent: Oct. 26, 2021

(54) DRYER STAND

(71) Applicant: LG ELECTRONICS INC., Seoul (KR)

(72) Inventors: Jekwang Youn, Seoul (KR); Youngdon Kim, Seoul (KR); Hyunsun Yoo, Seoul (KR); Jaehung Chun, Seoul (KR); Yousook Eun, Seoul (KR); Joogyeom Kim, Seoul (KR); Sungkyung Kim, Seoul (KR); Myongsun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 112 days.

(21) Appl. No.: 16/576,227

(22) Filed: Sep. 19, 2019

(65) Prior Publication Data

US 2020/0085250 A1   Mar. 19, 2020

Related U.S. Application Data

(60) Provisional application No. 62/733,478, filed on Sep. 19, 2018.

(30) Foreign Application Priority Data

Jun. 4, 2019   (KR) .................. 10-2019-0065851

(51) Int. Cl.
*F26B 25/00*   (2006.01)
*A47K 10/48*   (2006.01)
(Continued)

(52) U.S. Cl.
CPC .............. *A47K 10/48* (2013.01); *A45D 20/12* (2013.01); *F16M 11/126* (2013.01); *A45D 2020/128* (2013.01)

(58) Field of Classification Search
CPC ...... A47K 10/48; A45D 20/12; A45D 20/128; A45D 20/14; A45D 2020/126;
(Continued)

(56) References Cited

U.S. PATENT DOCUMENTS 5,956,861 A   9/1999   Barnes
9,408,452 B1   8/2016   Al-Khulaifi
(Continued)

FOREIGN PATENT DOCUMENTS

KR   10-1353923 B1   1/2014
TW   200614946 A   5/2006

*Primary Examiner* — John P Mccormack
(74) *Attorney, Agent, or Firm* — Birch, Stewart, Kolasch & Birch, LLP

(57) ABSTRACT

A dryer stand having a base, a body having a first end connected to the base and a second end spaced upward from the base, and a receptacle located in the second end of the body, the receptacle being mounted to the second end of the body is provided. The receptacle can receive a dryer for discharging drying air. The mounting of the receptacle enables at least one of a tilting operation and a rotation operation in a clockwise-counterclockwise direction so that the discharge direction of the drying air can be shifted toward a front-rear direction and clockwise-counterclockwise direction with respect to the dryer stand, either simultaneously or separately, depending on the position and size of the object to be dried.

16 Claims, 17 Drawing Sheets

(51) Int. Cl.
*A45D 20/12* (2006.01)
*F16M 11/12* (2006.01)

(58) Field of Classification Search
CPC ..... F16M 11/126; A01K 13/001; F24F 8/158; F24F 8/22; F24F 8/108; F24F 8/10
USPC .......................................................... 34/239
See application file for complete search history.

(56) References Cited

U.S. PATENT DOCUMENTS

| | | | | |
|---|---|---|---|---|
| 2004/0075033 | A1* | 4/2004 | Fujitaka ................ | A45D 20/12 248/274.1 |
| 2006/0076464 | A1* | 4/2006 | Van ........................ | A45D 44/04 248/122.1 |
| 2010/0014844 | A1* | 1/2010 | Dannenberg ........... | A45D 20/12 392/381 |
| 2010/0101110 | A1* | 4/2010 | Lee ........................ | A47K 10/48 34/488 |
| 2010/0307019 | A1 | 12/2010 | Park et al. | |
| 2018/0103741 | A1 | 4/2018 | Karbakhsh | |

* cited by examiner

DRYER STAND

CROSS REFERENCE TO RELATED APPLICATIONS

This application claims the priority benefit of U.S. Provisional Application No. 62/733,478, filed on Sep. 19, 2018, and Korean Patent Application No. 10-2019-0065851, filed on Jun. 4, 2019, the entire disclosures of all of which are hereby expressly incorporated by reference into the present application.

BACKGROUND OF THE DISCLOSURE

Field of the Disclosure

The present disclosure relates to a dryer stand in which a dryer for discharging drying air may be mounted. More particularly, the present disclosure relates to a dryer stand which can change the discharge direction of drying air according to the position and size of a drying target by tilting a receptacle in which the dryer is mounted in a front-rear direction or rotating in a left-right direction (clockwise-counterclockwise direction).

Description of the Related Art

When using a dryer to dry the human body, a user typically moves the dryer toward a portion of the human body to perform drying while holding the dryer.

In order to solve an inconvenience that a user must hold the dryer to perform drying while holding the dryer, a stand which can mount a dryer has been previously proposed in the related art.

However, a stand according to the related art has a problem in that when a user wants to change the portion of the human body to be dried, the user must manually adjust the direction of the stand or move the human body so that the air discharge direction of the dryer mounted in the stand faces the portion to be dried.

In particular, the stand according to the related art has a difficulty in changing the air discharge direction of the dryer in response to frequent changes of position of the drying target, such as when the drying target is an infant or a companion animal.

In order to solve such a problem, US 2010/0307019 A1 discloses a configuration in which the dryer mounted in the stand is tilted, but, separately, does not provide a configuration for rotating the dryer to the left and right. Therefore, there is a problem in that it is difficult to cope with the change of position of the drying target.

In addition, in the above mentioned US 2010/0307019 A1, as the dryer is integrally provided in the stand, it is difficult for the user to perform drying while carrying and holding the dryer.

Furthermore, the stand according to the related art did not propose a mechanical configuration that can adjust the air discharge direction of the dryer in the left-right direction as well as in the front-rear direction, either simultaneously, or separately.

SUMMARY OF THE DISCLOSURE

The present disclosure has been made in view of the above problems, and provides a dryer stand that allows a user to dry a drying target without holding the dryer.

The present disclosure further provides a dryer stand for shifting (i.e., tilting) the discharge direction of drying air in the front-rear direction according to the position and size of the drying target.

The present disclosure further provides a dryer stand for shifting (i.e., rotation operation in the left-right direction) the discharge direction of the drying air toward the left-right direction according to the position and size of the drying target.

The present disclosure further provides a dryer stand for shifting the discharge direction of drying air at the same time or at the different time in the front-rear direction and the left-right direction.

In accordance with an aspect of the present disclosure, a dryer stand includes: a base which is disposed in a lower side; a receptacle in which a dryer for discharging drying air is mounted; and a body which is disposed above the base, and accommodates the receptacle therein at a certain height in an upward direction from the base.

At this time, the receptacle is configured to be able to perform a tilting operation, so that the discharge direction of the drying air can be shifted in the front-rear direction in correspondence with the position and size of the object to be dried.

The body includes: an upper body which is disposed adjacent to an upper side of the receptacle; and a side body which is disposed between the upper body and the base.

The dryer stand further includes: a tilting pin which extends outward from an outer surface of the receptacle and becomes a center of the tilting operation of the receptacle; and a pin mount which has one side coupled to the upper body, and has an insertion hole into which the tilting pin is inserted so that the tilting pin is rotatably supported.

Such tilting pin and pin mount configuration is a configuration for the tilting operation of the receptacle described above.

Meanwhile, the receptacle is provided to be rotatable in the left-right direction, so that the discharge direction of the drying air can be shifted in the left-right direction in correspondence with the position and size of the object to be dried.

To this end, the dryer stand of the present disclosure further includes: a rotation motor which is electrically driven; and a power transmission mechanism which mediates transmission of a power of the rotation motor to the receptacle.

The receptacle is coupled to the upper body so as to be tiltable, and rotated together when the upper body is rotated in a left-right direction.

Further, the power transmission mechanism accommodates at least a portion of the receptacle therein, and has a space, corresponding to a trajectory of tilting operation of the receptacle, formed therein. Such a configuration may allow the tilting operation and the left-right rotation operation of the receptacle to be performed at the same time or at a different time.

BRIEF DESCRIPTION OF THE DRAWINGS

The above and other objects, features and advantages of the present disclosure will be more apparent from the following detailed description in conjunction with the accompanying drawings, in which.

DESCRIPTION OF EXEMPLARY EMBODIMENTS

Exemplary embodiments of the present disclosure are described with reference to the accompanying drawings in detail. The same reference numbers are used throughout the drawings to refer to the same or like parts. Detailed descriptions of well-known functions and structures incorporated herein may be omitted to avoid obscuring the subject matter of the present disclosure.

Figure 1:
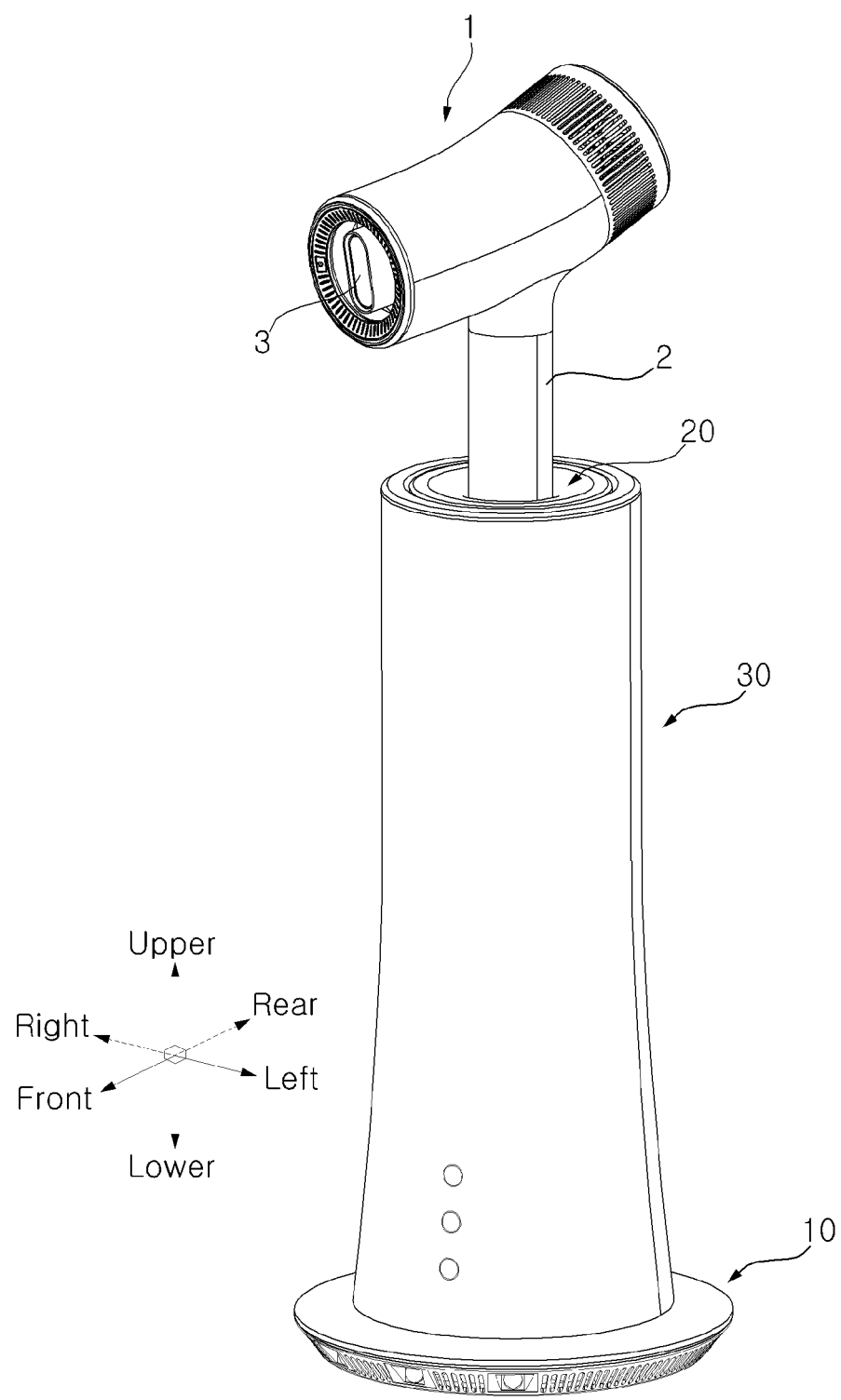
FIG. 1 is a perspective view of a state in which a dryer is mounted in a dryer stand according to an embodiment of the present disclosure.

The present disclosure can be described with a three-dimensional coordinate system in which each side shown in FIG. 1 is named front, rear, upper, lower, left, and right.

The present disclosure may be described with reference to a spatial orthogonal coordinate system based on X, Y and Z axes that are orthogonal to each other shown in FIG. 2, and the like. In the present specification, the X-axis, the Y-axis, and the Z-axis are defined by setting the vertical direction as the Z-axis direction, and setting the front-rear direction as the X-axis direction. Each axis direction (X-axis direction, Y-axis direction, Z-axis direction) means the both directions in which each axis extends. The symbol "+" in front of each axis direction (+X-axis direction, +Y-axis direction, +Z-axis direction) means a positive direction which is one of the both directions in which each axis extends. The sign "−" in front of each axis direction (−X-axis direction, −Y-axis direction, −Z-axis direction) means a negative direction which is one of the both directions in which each axis extends.

Hereinafter, a dryer stand according to an embodiment of the present disclosure will be described with reference to FIGS. 1 to 9.

Figure 2:
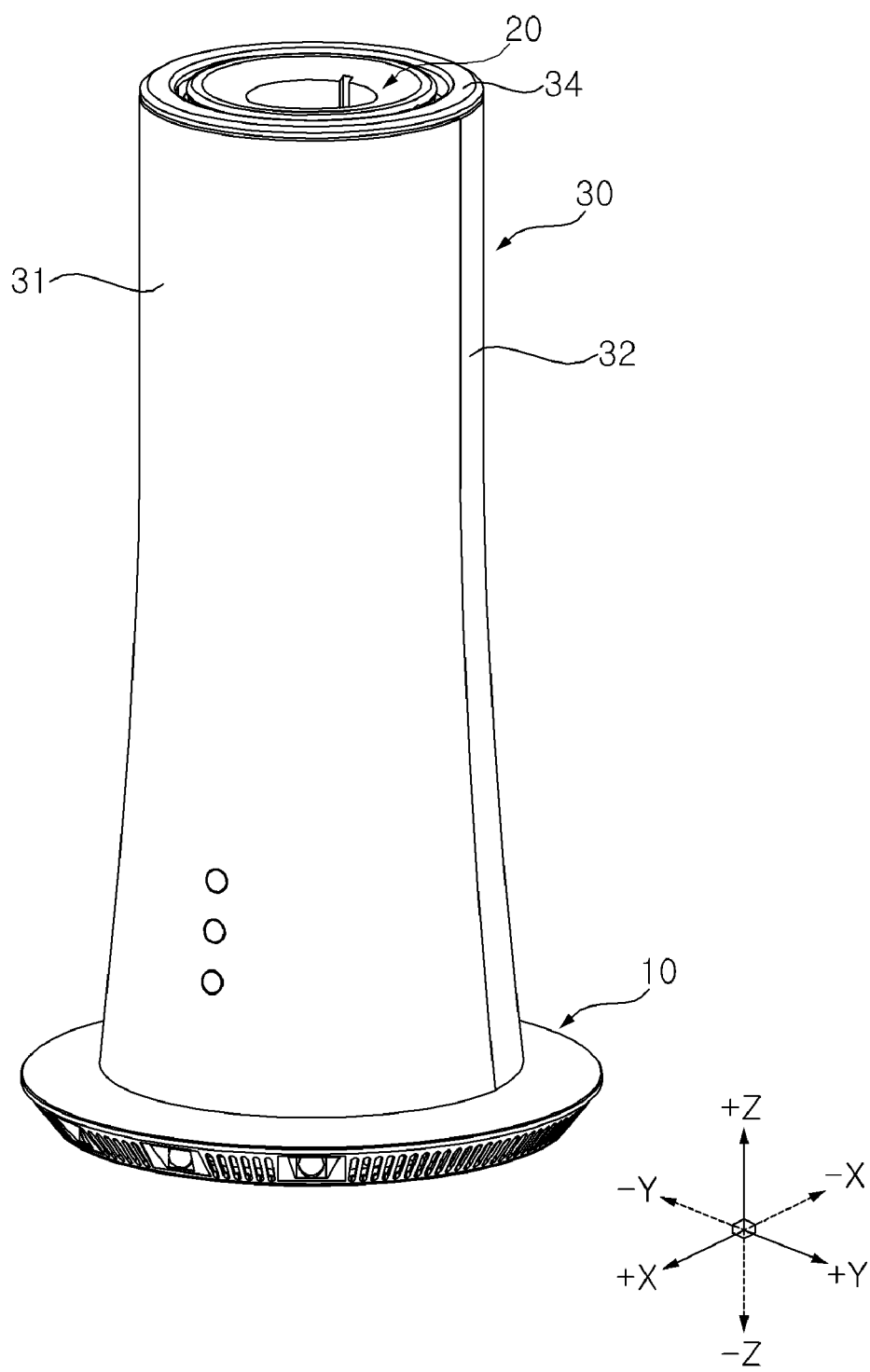
FIG. 2 is a perspective view of a state in which a dryer is not mounted in a dryer stand according to an embodiment of the present disclosure.
Figure 3:
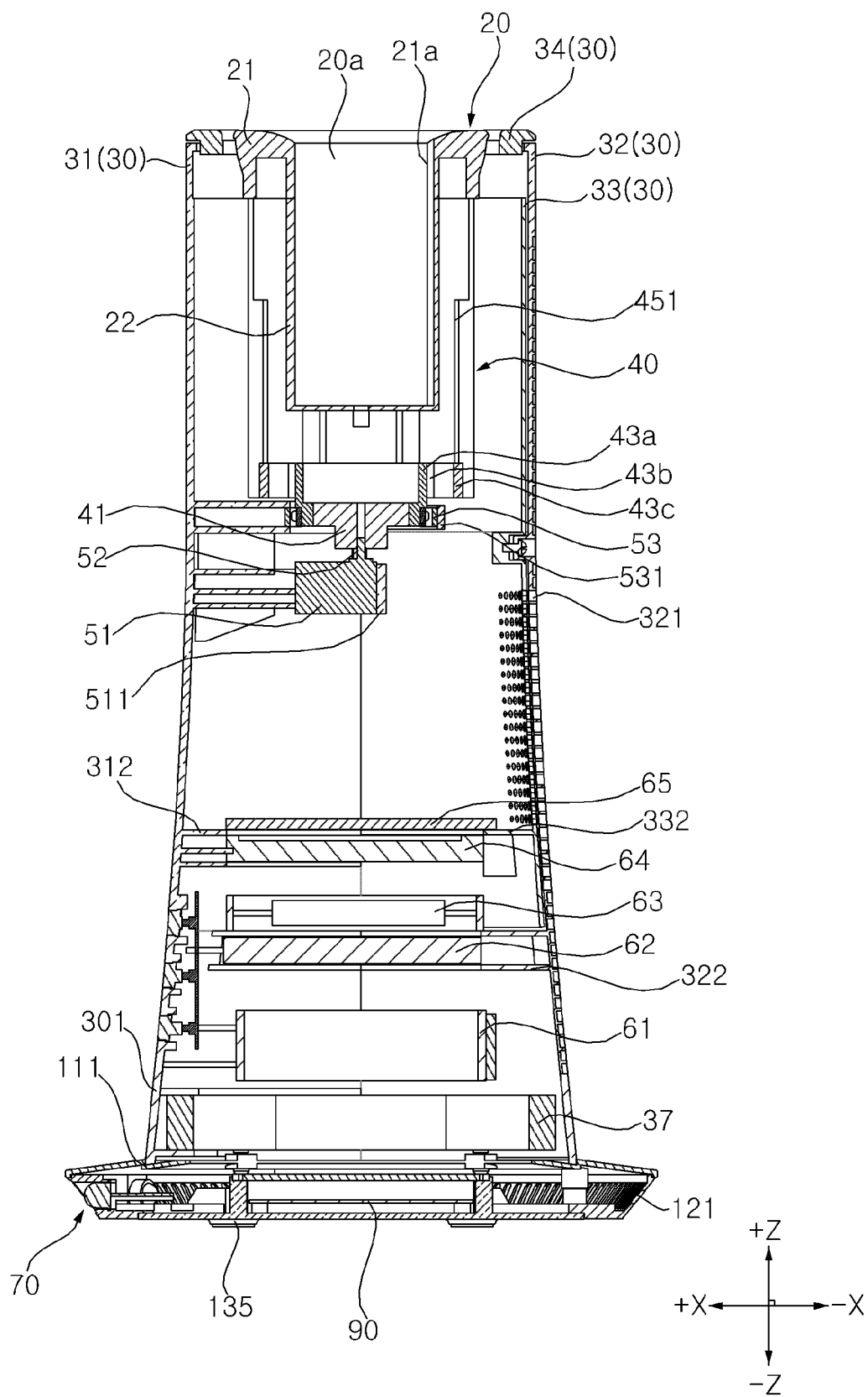
FIG. 3 is a longitudinal cross-sectional view of a dryer stand according to an embodiment of the present disclosure from the left.
Figure 4:
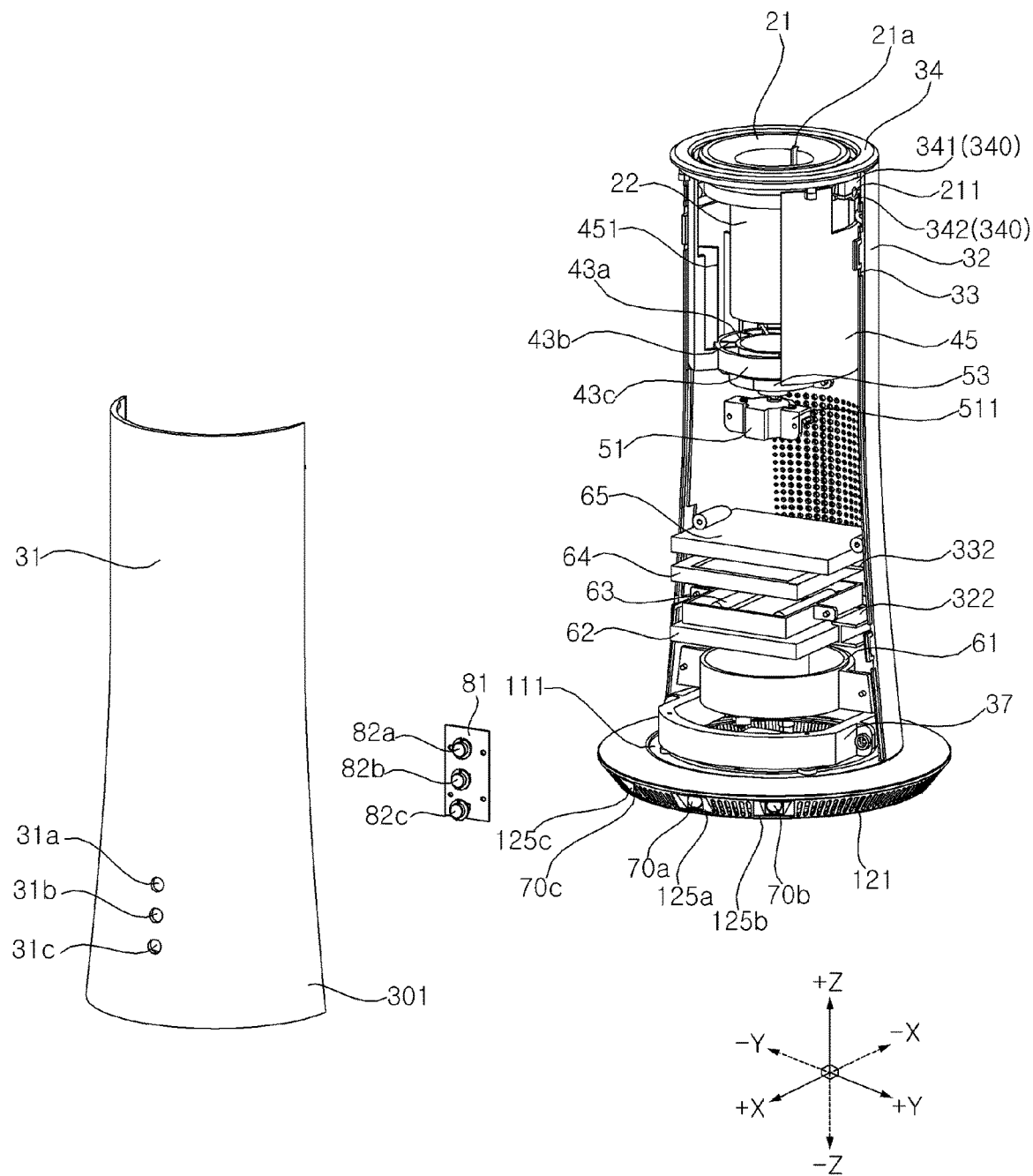
FIG. 4 is a front exploded perspective view of a dryer stand according to an embodiment of the present disclosure.
Figure 5:
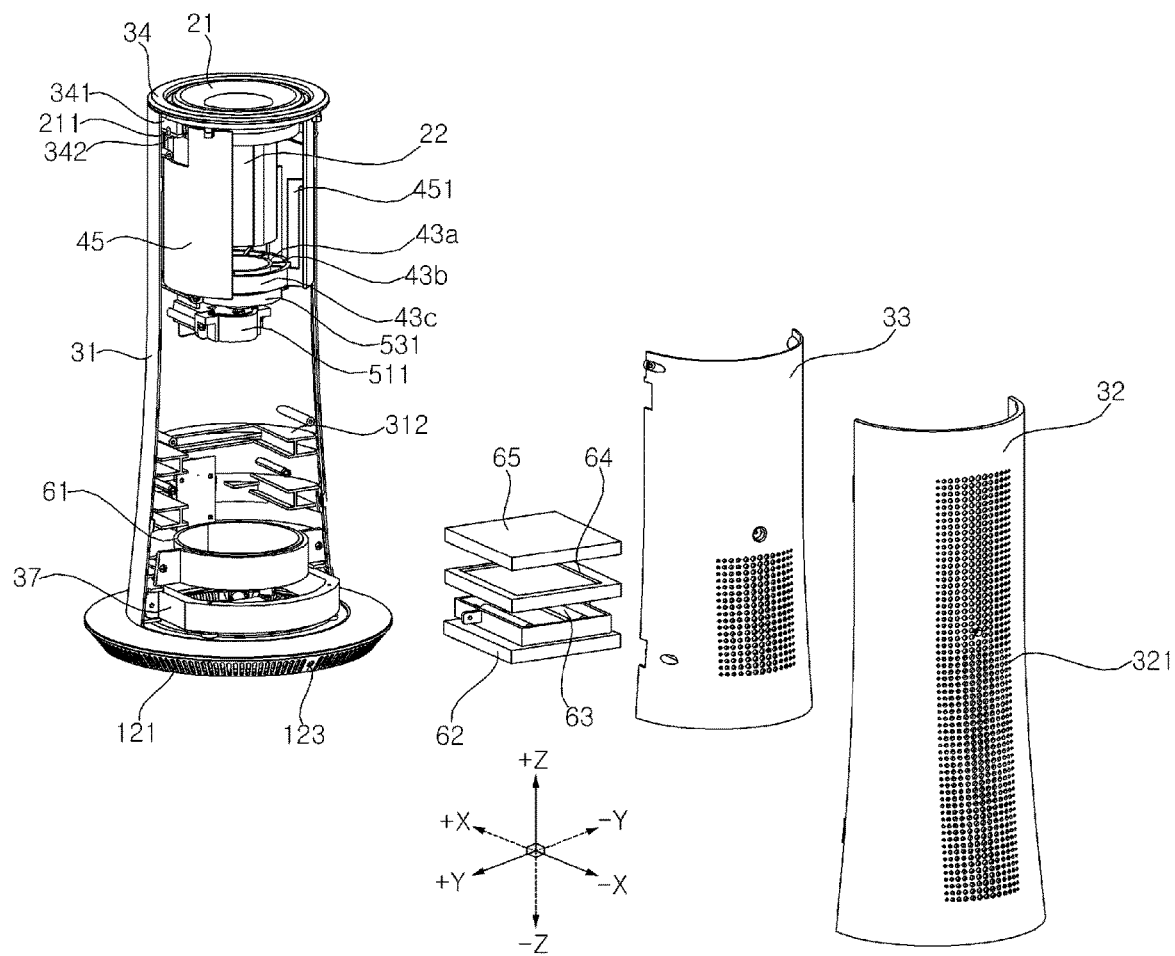
FIG. 5 is a rear exploded perspective view of a dryer stand according to an embodiment of the present disclosure.
Figure 6:
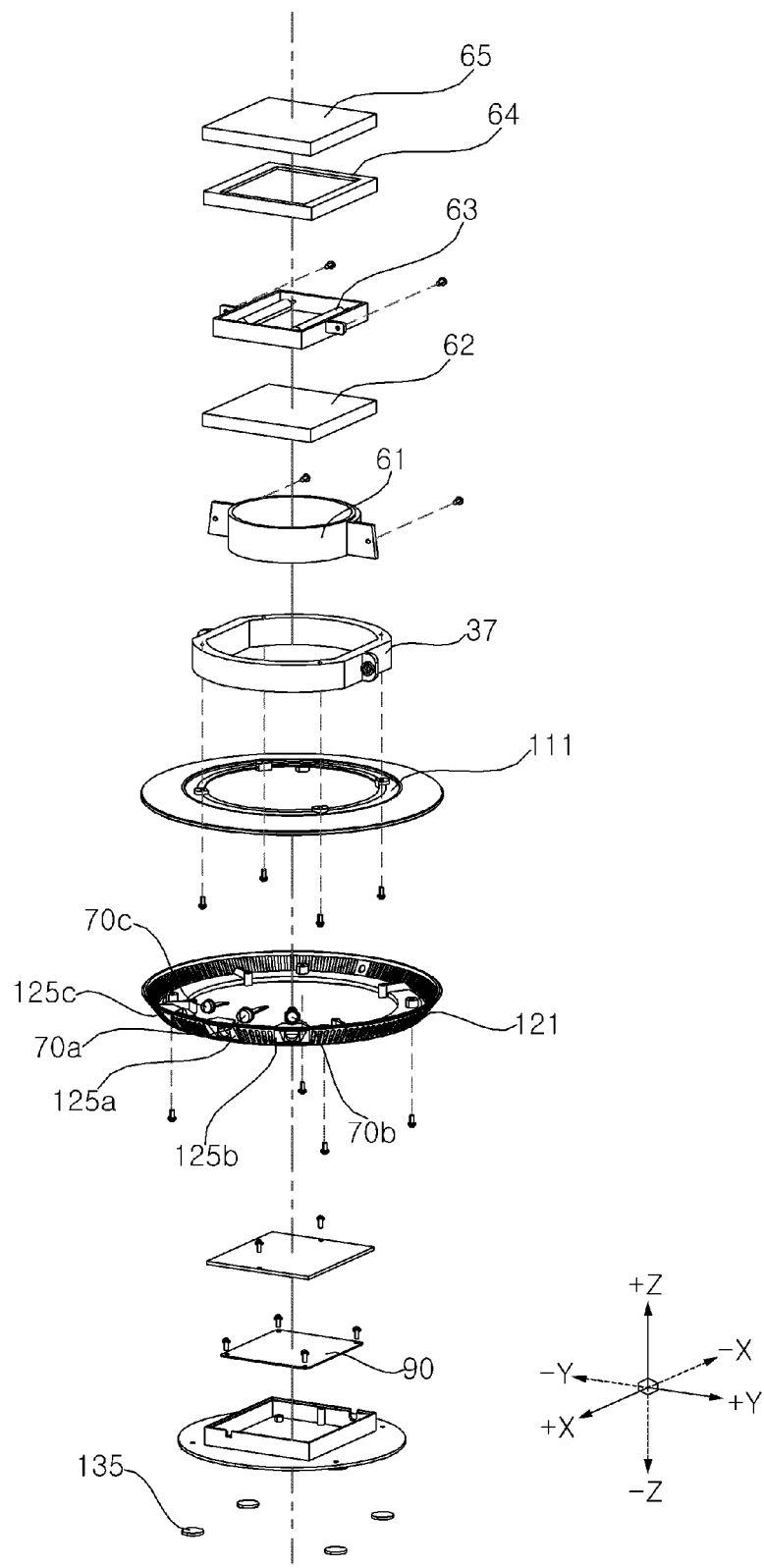
FIG. 6 is an exploded perspective view of the lower part of a dryer stand according to an embodiment of the present disclosure.
Figure 7A:
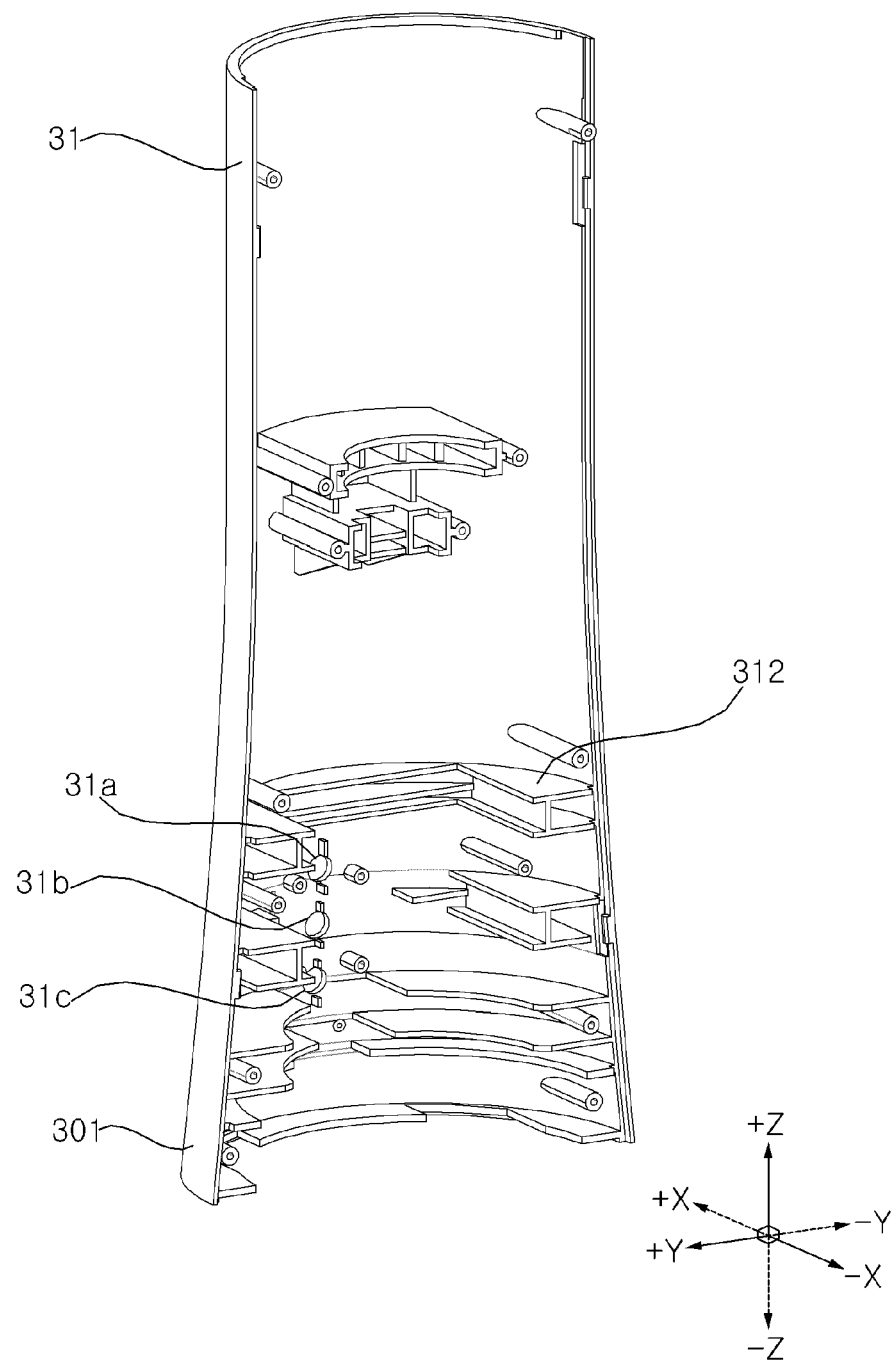
FIG. 7A is a perspective view of a front body of a dryer stand according to an embodiment of the present disclosure.
Figure 7B:
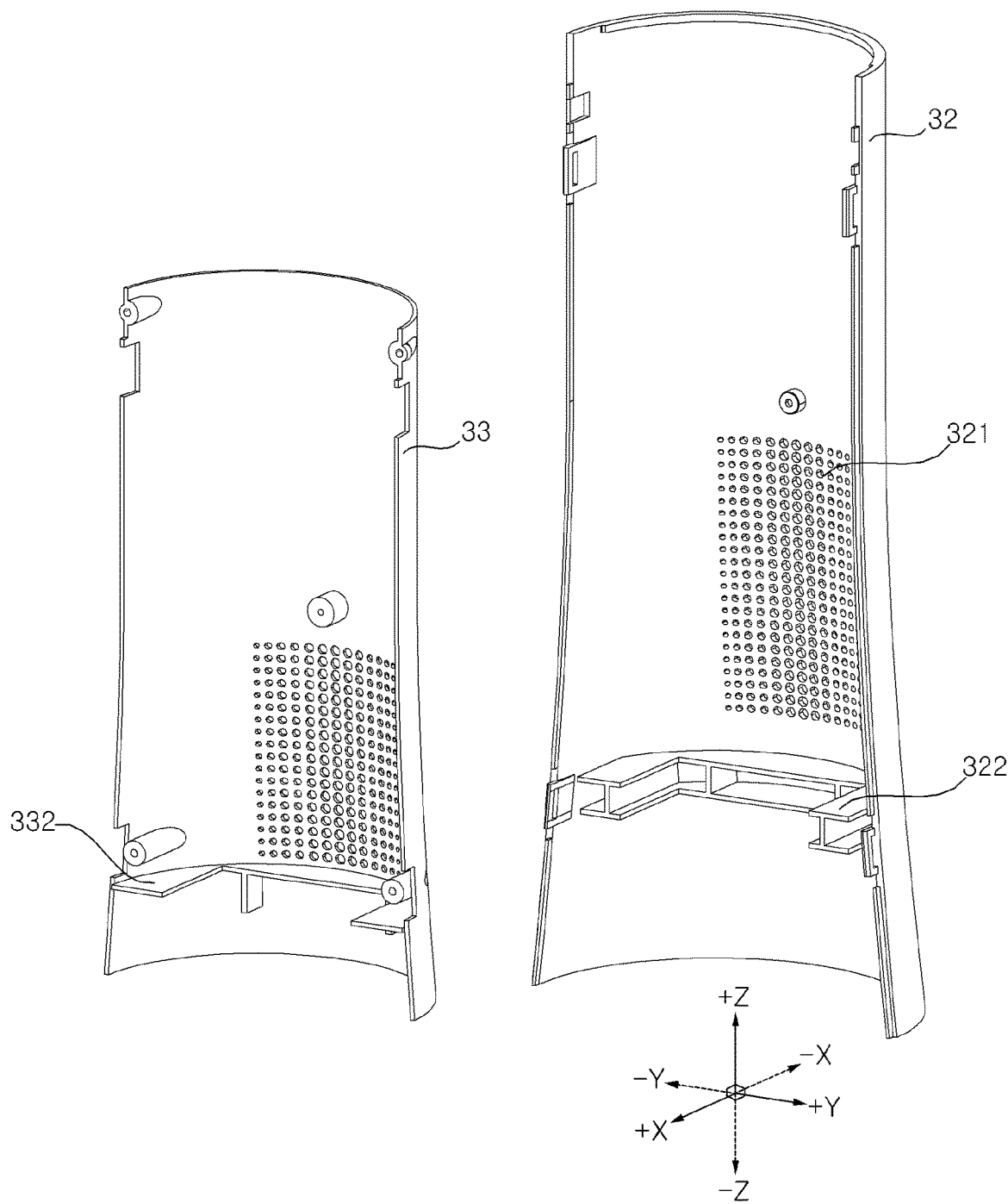
FIG. 7B is a perspective view of a rear body and an inner body of a dryer stand according to an embodiment of the present disclosure.
Figure 8:
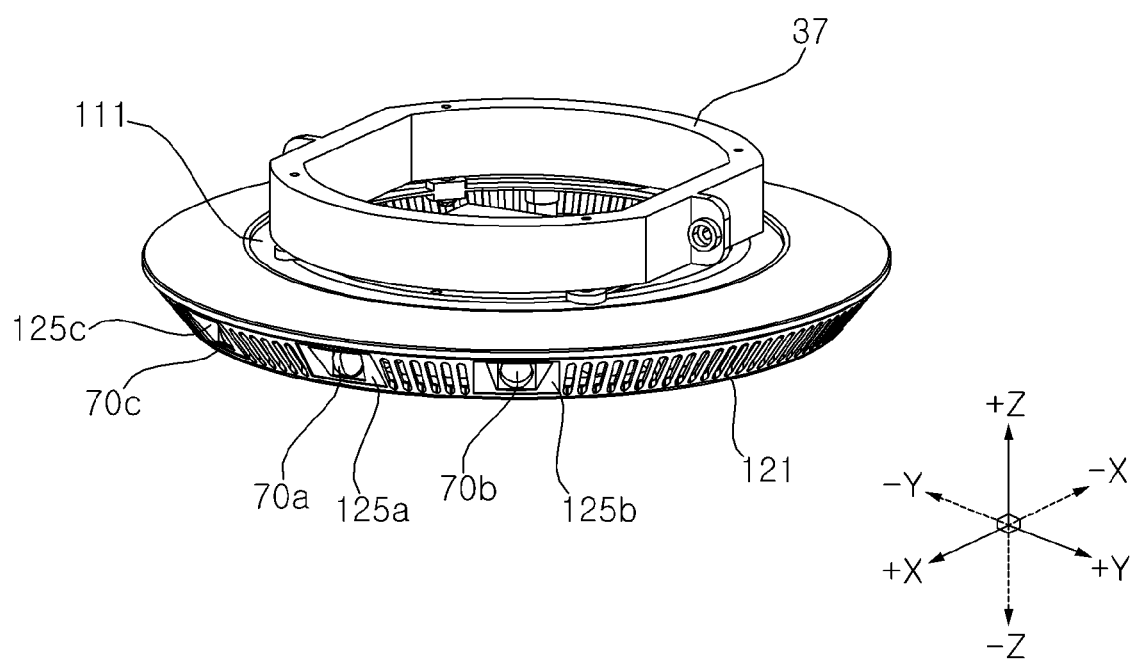
FIG. 8 is a perspective view of a base and a supporter of a dryer stand according to an embodiment of the present disclosure.
Figure 9:
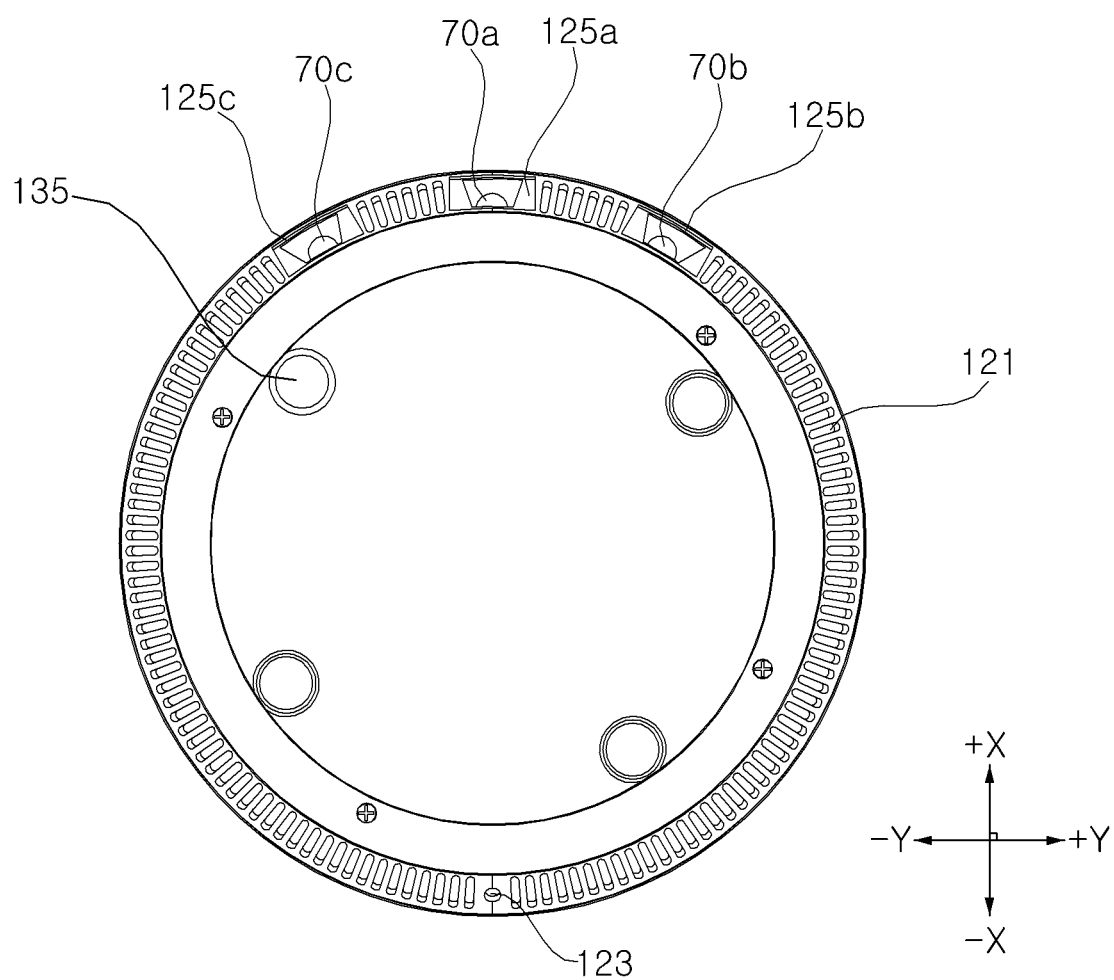
FIG. 9 is a bottom view of a dryer stand according to an embodiment of the present disclosure.

FIG. 1 is a perspective view of a state in which a dryer is mounted in a dryer stand according to an embodiment of the present disclosure, FIG. 2 is a perspective view of a state in which a dryer is not mounted in a dryer stand according to an embodiment of the present disclosure, FIG. 3 is a longitudinal cross-sectional view of a dryer stand according to an embodiment of the present disclosure from the left, FIG. 4 is a front exploded perspective view of a dryer stand according to an embodiment of the present disclosure, and FIG. 5 is a rear exploded perspective view of a dryer stand according to an embodiment of the present disclosure. FIG. 6 is an exploded perspective view of the lower part of a dryer stand according to an embodiment of the present disclosure, FIG. 7A is a perspective view of a front body of a dryer stand according to an embodiment of the present disclosure, FIG. 7B is a perspective view of a rear body and an inner body of a dryer stand according to an embodiment of the present disclosure, FIG. 8 is a perspective view of a base and a supporter of a dryer stand according to an embodiment of the present disclosure, and FIG. 9 is a bottom view of a dryer stand according to an embodiment of the present disclosure.

In the dryer stand (hereinafter, simply, referred to as 'stand') according to an embodiment of the present disclosure, as shown in FIG. 1, a dryer 1 for discharging drying air may be mounted so that a user may perform drying of a drying target without gripping the dryer.

As shown in FIGS. 1 and 2, the stand according to an embodiment of the present disclosure may include a base 10 which is disposed in a lower side and serves as a pedestal, a receptacle 20 in which the dryer 1 is mounted, and a body 30 which is disposed above the base 10 and accommodates the receptacle 20 therein at a certain height in an upward direction from the base 10. For example, the body may have a first end connected to the base and a second end spaced upward from the base. The dryer 1 may be detachably mounted in the receptacle 20.

As shown in FIG. 2, the body 30 may include an upper body 34 disposed adjacent to an upper side of the receptacle 20, and a side body 31, 32 disposed between the upper body 34 and the base 10. That is, the upper body 34 may be disposed at the second end of the body 30. The side body 31, 32 may form a side shape of the stand, and may include a front body 31 disposed at the front side and a rear body 32 disposed at the rear side.

As shown in FIGS. 3 to 5, 7A, and 7B, the front body 31 and the rear body 32 may be detachably coupled to each other by a plurality of fastening members (not shown). As a fastening method of the front body 31 and the rear body 32 using the fastening member, a screw fastening method, a snap fit fastening method using a snap protrusion-groove, and/or a welding method may be used.

As described above, because the side body 31, 32 includes the front body 31 and the rear body 32, if it is desired to access the inside of the stand, removing only one of the front body 31 and the rear body 32 is necessary, so that repair, replacement, and the like of the internal components of the stand can be easily achieved. However, in some embodiments, the front body 31 and the rear body 32 may be integrally formed to form a side body as a single member.

As shown in FIGS. 3 and 4, a lower end 301 of the side body 31, 32 may be fitted into a furrow 111 formed in at least a part of an upper end of the base 10. As an example, such a furrow 111 may be formed in a ring shape.

The body 30, in particular, the side body 31, 32 may accommodate the receptacle 20 therein. In addition, various components, such as a rotation motor, a power transmission mechanism, a fan, an air purifier, which will be described later, may be accommodated inside the body 30 and may be detachably coupled to the body 30. That is, the side body 31, 32 may serve as a support or a stem. However, in some embodiments, a stem may be provided separately from the body 30 so the body 30 is not limited to a stem.

As shown in FIGS. 3 to 6, the stand according to an embodiment of the present disclosure may include an air purifier. The air purifier may include a HEPA filter 62, an ultraviolet generator 63, a photocatalyst filter 64, a carbon filter 65, and a fan 61. The HEPA filter 62, the ultraviolet generator 63, the photocatalyst filter 64, and the carbon filter 65 may be sequentially disposed from the lower side toward the upper side, but they are not limited to such a disposition order. That is, in addition to the embodiment having all of the HEPA filter 62, the ultraviolet generator 63, the photocatalyst filter 64, and the carbon filter 65, it should be noted that a combination of some of them or an embodiment having other filters such as antibacterial filter, a deodorizing filter may also be provided.

The HEPA filter 62 is an air filter, and is a filter that can remove fine particles such as dust, mite carcasses, pollen, tobacco smoke (particles), floating fungi, animal hair, and the like as well as fine dust floating with air.

The ultraviolet generator 63 may be constituted of an ultraviolet light emitting diode (UV LED) or an ultraviolet (UV) lamp. The ultraviolet generator 63 may sterilize bacteria or microorganisms suspended in the air by irradiating ultraviolet light.

The photocatalyst filter 64 may decompose harmful substances by a photochemical reaction to perform an odor removing function (that is, a deodorizing function) of a companion animal or human. The photocatalyst filter 64 may be formed of a breathable adsorption base material for adsorbing harmful substances in the air, a photocatalyst attached to the breathable adsorption base material, and a cocatalyst for activating the photocatalyst.

The ultraviolet generator 63 may serve as a light source for activating the photocatalyst provided in the photocatalyst filter 64. Alternatively, in some embodiments, a light emitting module for activating the photocatalyst may be provided separately from the ultraviolet generator 63.

The carbon filter 65 is a filter that can remove odors and harmful gases contained in the air through a chemical adsorption method using activated carbon.

The fan 61 may cause a flow of air to be introduced into the body 30 and then discharged to the outside. The fan 61 may be provided with various means and configurations that can cause the above mentioned flow of air, such as a centrifugal, a four-flow, and an axial fan.

As shown in FIGS. 1 to 6, the inflow of air by the fan 61 may be accomplished through a suction hole 121 formed in the side surface of the base 10, and the air may be discharged by the fan 61 through a discharge hole 321 formed in the rear body 32.

The HEPA filter 62, the ultraviolet generator 63, the photocatalyst filter 64, and the carbon filter 65 may be disposed on a flow path of air introduced into the suction hole 121 by the fan 61 and discharged to the discharge hole 321. Thus, the air may be discharged to the outside of the body 30 while various harmful substances, odors, and the like contained in the air introduced into the body 30 are removed.

Consequently, the stand according to an embodiment of the present disclosure may be equipped with the dryer 1, and further, may purify the indoor air.

As shown in FIGS. 3 to 6, 7A and 7B, the air purifier may be detachably coupled to the side body 31, 32. To this end, a plurality of guide ribs 312 and 322 having a shape corresponding to at least a portion of the outer surface of the air purifier may be formed on the inner surface of the side body 31, 32. If an inner body 33 is provided, which will be described later, a guide rib 332 may be formed on the inner surface of the inner body 33 as well. That is, the air purifier may be seated on and coupled to the plurality of guide ribs 312 formed on the inner surface of the front body 31, to the plurality of guide ribs 322 formed on the inner surface of the rear body 32, and to the guide rib 332 formed on the inner surface of the inner body 33 described later, and may be fixed in a preset position. Such guide ribs 312, 322, and 332 guide the coupling of the air purifier to the body, and may allow easy separation of the air purifier from the body when replacement and repair are required.

In some embodiments, the air purifier may be provided with a separate fastening member (for example, a screwing member) for coupling to the side body 31, 32 and/or the inner body 33 in addition to the guide rib 312, 322, 332.

As shown in FIG. 8, the stand according to an embodiment of the present disclosure may further include a supporter 37 in the lower side in order to prevent the risk of overturning of the stand due to collision with the infant or companion animal. The supporter 37 may be provided in the upper side of the base 10, and at least a part of the outer surface is in close contact with the inner surface of the side body 31, 32, so that the side body 31, 32 can be more firmly coupled to the base 10 in addition to the above overturning prevention function.

As shown in FIG. 8, the stand according to the embodiment of the present disclosure may be provided with a detection device 70. The detection device 70 may detect the position and size of a drying target, such as an infant or a companion animal adjacent to the stand, and may be, for example, an infrared sensor. The detection device 70 may include a plurality of detection devices in correspondence with a preset detection range. By way of example, three detection devices 70a, 70b, and 70c are provided inside the base 10.

The inner surface of the housing 125a, 125b, and 125c in which the detection device 70a, 70b, 70c of the base 10 is installed may be formed so that each of the detection devices 70a, 70b, and 70c has a detection range of 60°. Thus, the stand may be provided with a detection device having a detection range of 180 degrees oriented toward the front of the stand. However, this is merely an example, and it is obvious that the number or detection range of the detection devices can vary.

The stand according to the embodiment of the present disclosure rotates the receptacle 20 in the left-right direction (clockwise-counter clockwise direction) according to the position and size of the drying target measured by the detection device, so that the air discharge direction of the dryer 1 mounted in the receptacle 20 can be shifted in the left-right direction, which will be described in more detail below.

The stand according to the embodiment of the present disclosure may be provided with a plurality of pads 135 on the bottom in order to prevent sliding on the ground or otherwise getting out of the installation position due to collision with the drying target.

The present disclosure is not limited to mounting the dryer 1 on the receptacle 20, but has been devised to provide a stand that can change the air discharge direction of the dryer 1 according to the position and size of the drying target by rotating the receptacle 20 in the left-right directions or tilting in the front-rear directions. To this end, as shown in FIGS. 3 to 5, the receptacle 20 may be accommodated inside the body 30 and a power transmission mechanism 40 to accomplish the slanting operation (i.e., the tilting operation) in the front-rear direction.

At this time, as the power transmission mechanism 40 is rotated in the left-right direction according to the operation of a rotation motor 51, the receptacle 20 can be tilted simultaneously or separately from being rotated in the left-right direction, which will be described in detail later.

Hereinafter, referring to FIGS. 1 to 15, a configuration for shifting the air discharge direction of the dryer 1 and a configuration related thereto among the configurations of the stand according to an embodiment of the present disclosure will be described in detail.

Figure 10:
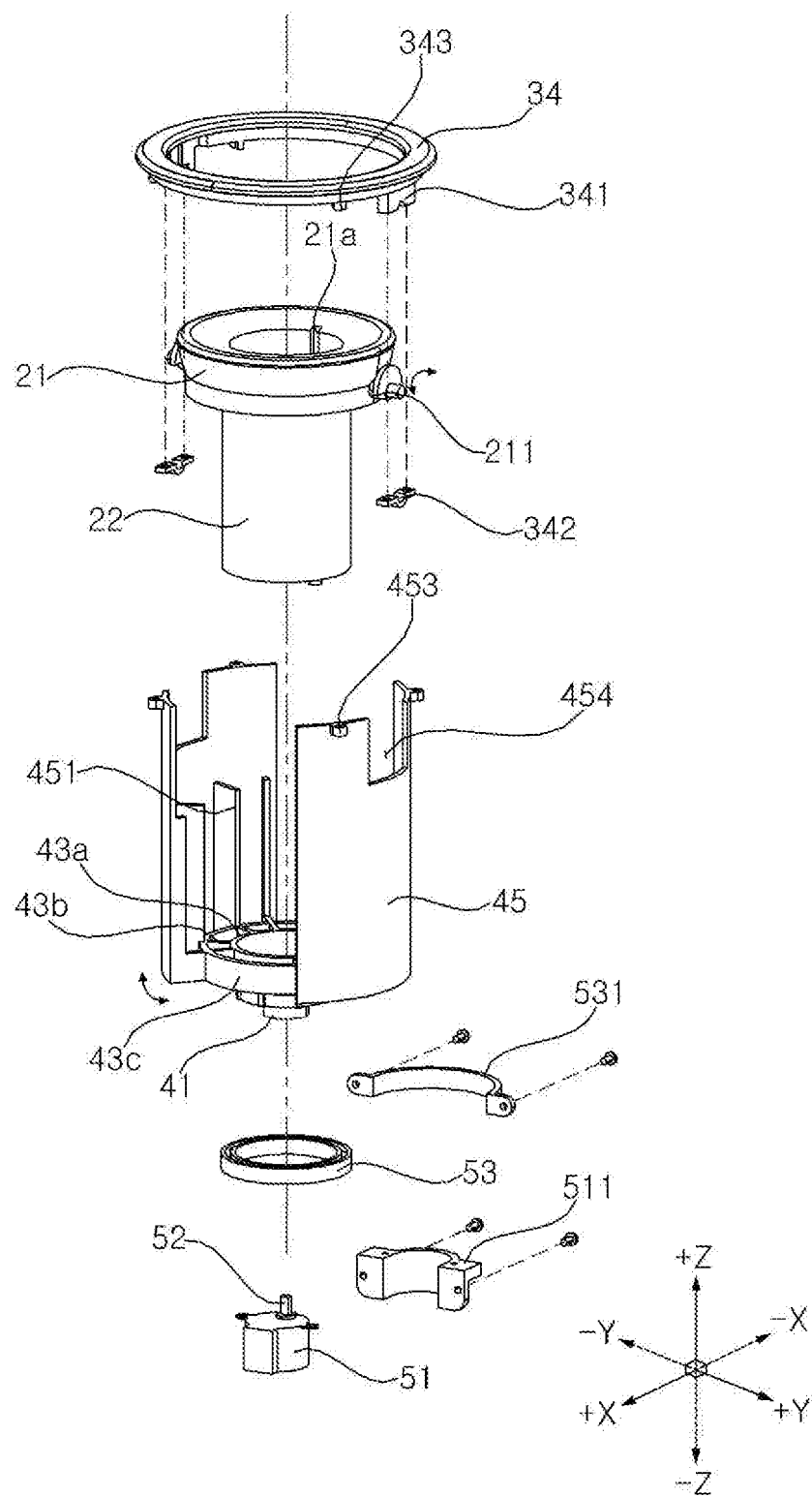
FIG. 10 is an exploded perspective view of an upper side of a dryer stand according to an embodiment of the present disclosure.
Figure 11:
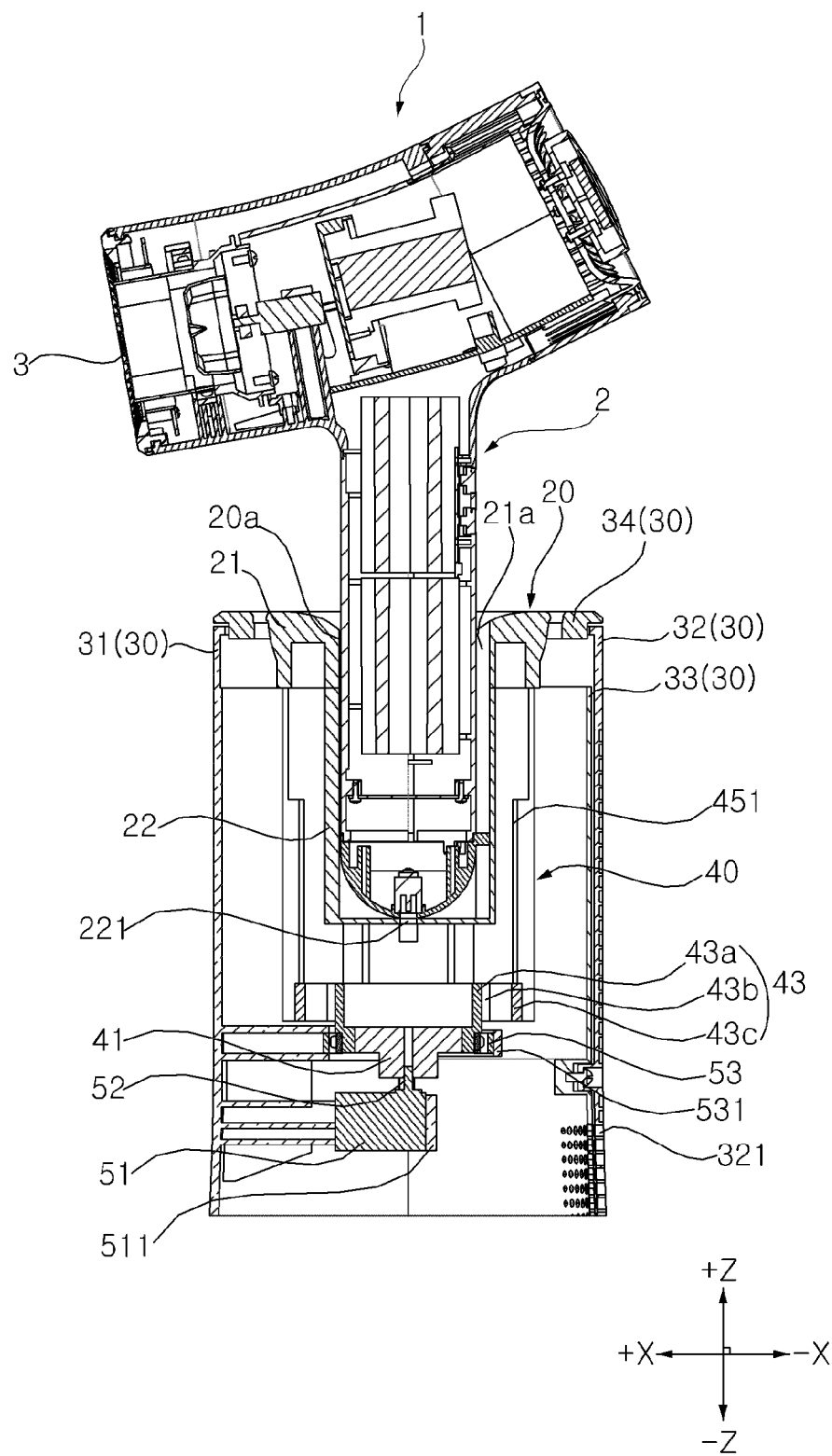
FIG. 11 is an upper side cross-sectional view showing a state in which a dryer is mounted in a dryer stand according to an embodiment of the present disclosure.
Figure 12A:
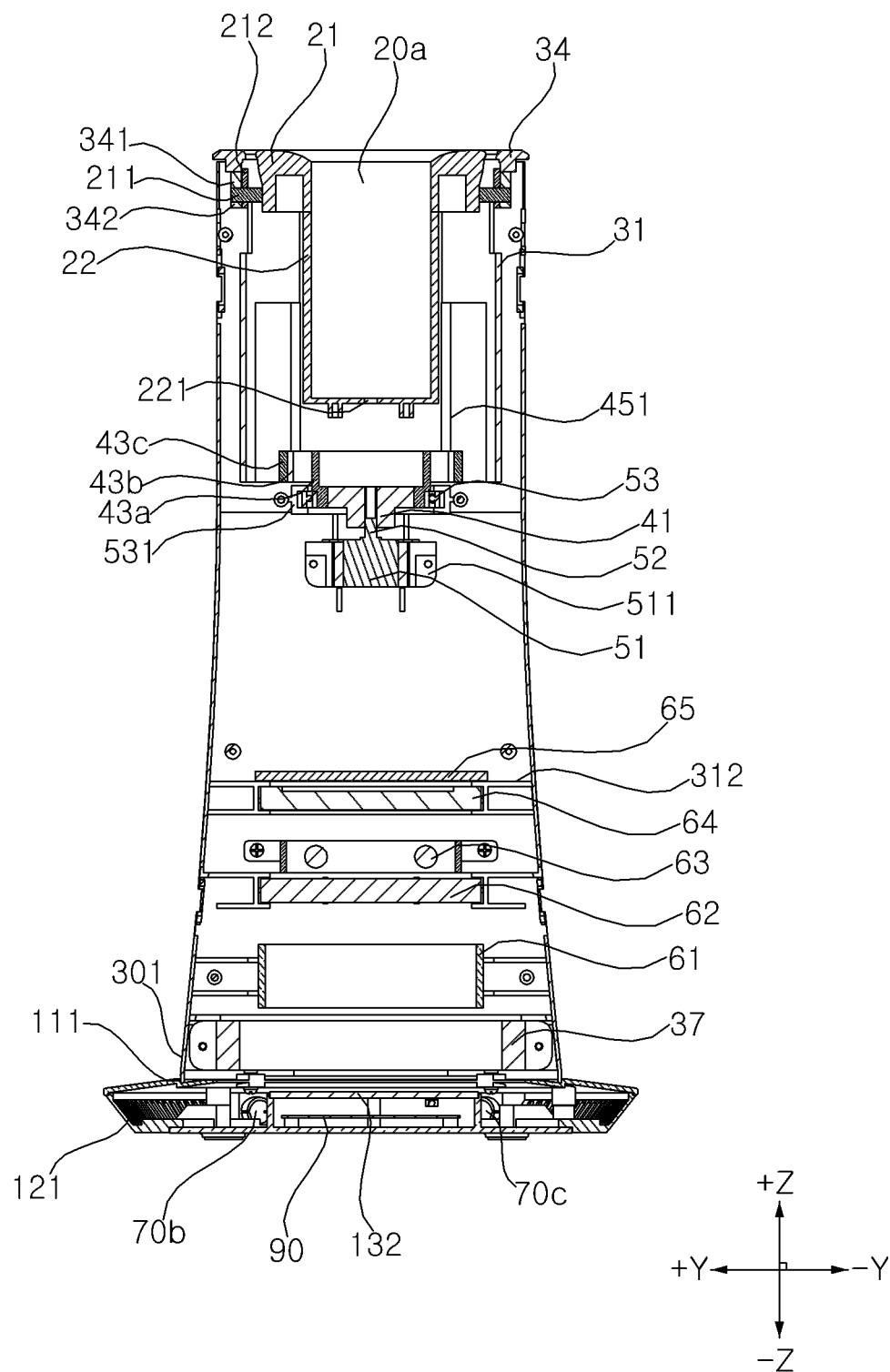
FIG. 12A is a longitudinal sectional view of a dryer stand according to an embodiment of the present disclosure as viewed from the rear.
Figure 12B:
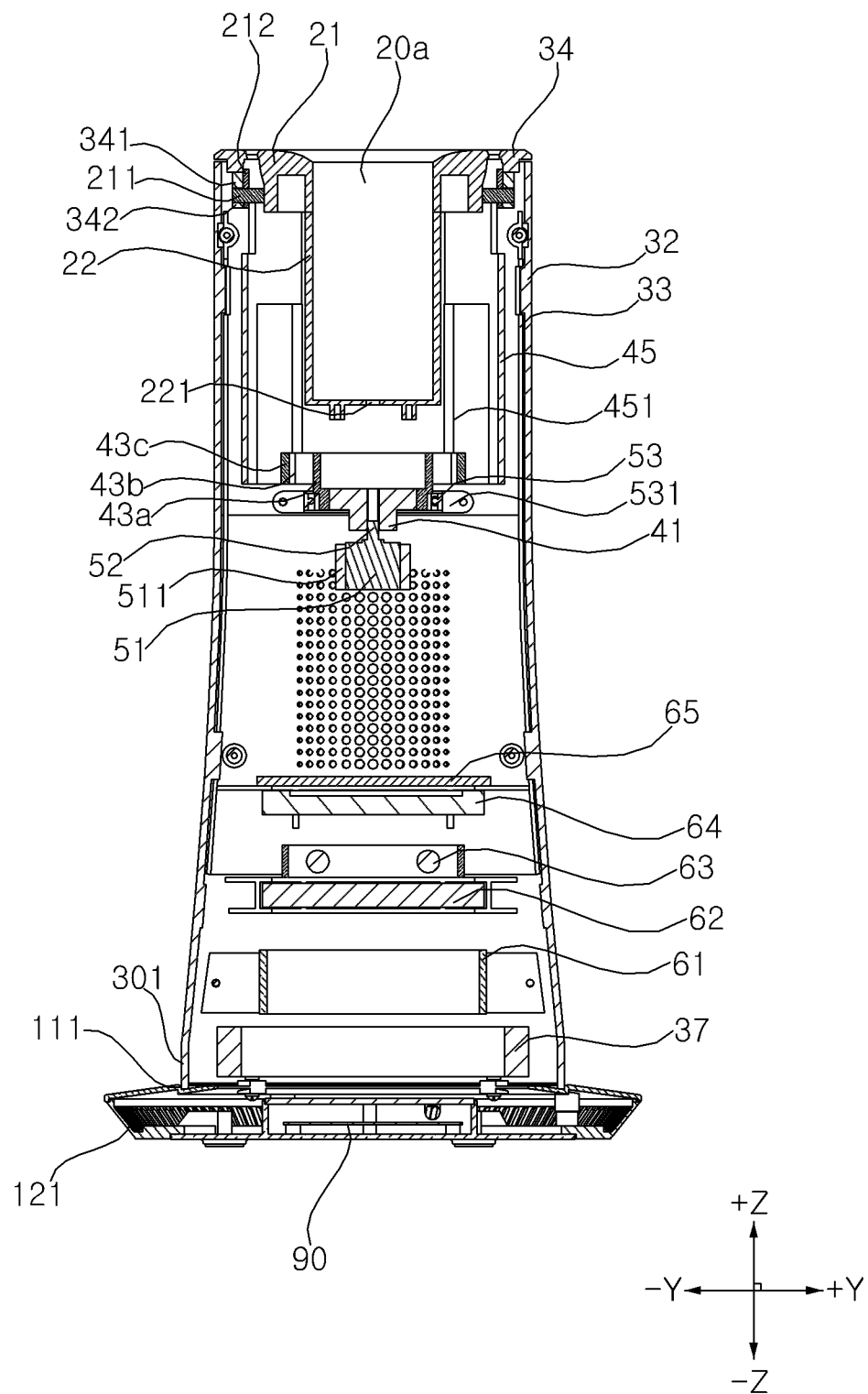
FIG. 12B is a longitudinal sectional view of a dryer stand according to an embodiment of the present disclosure as viewed from the front.
Figure 13:
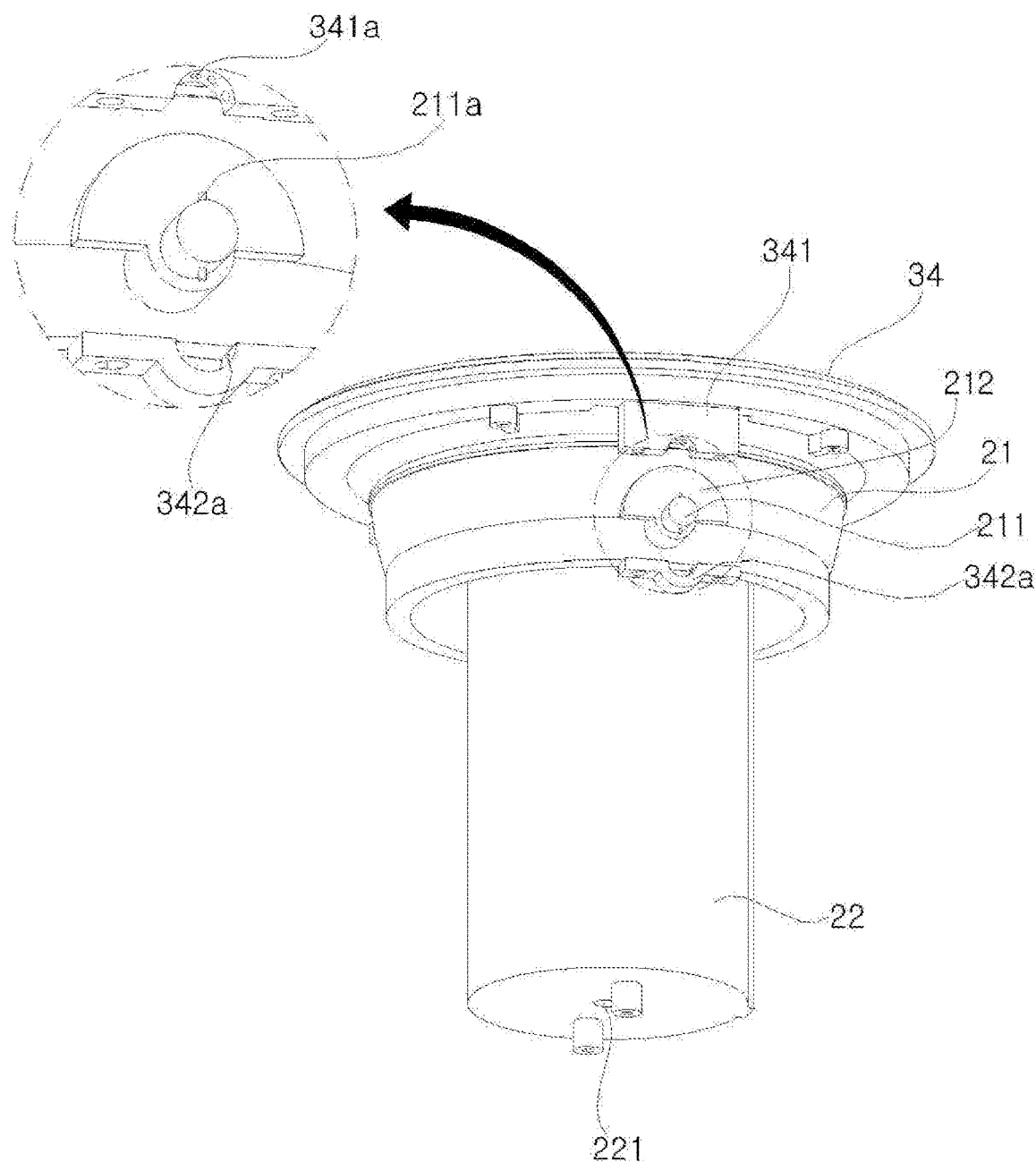
FIG. 13 is a perspective view of a receptacle and an upper body of a dryer stand according to an embodiment of the present disclosure.
Figure 14:
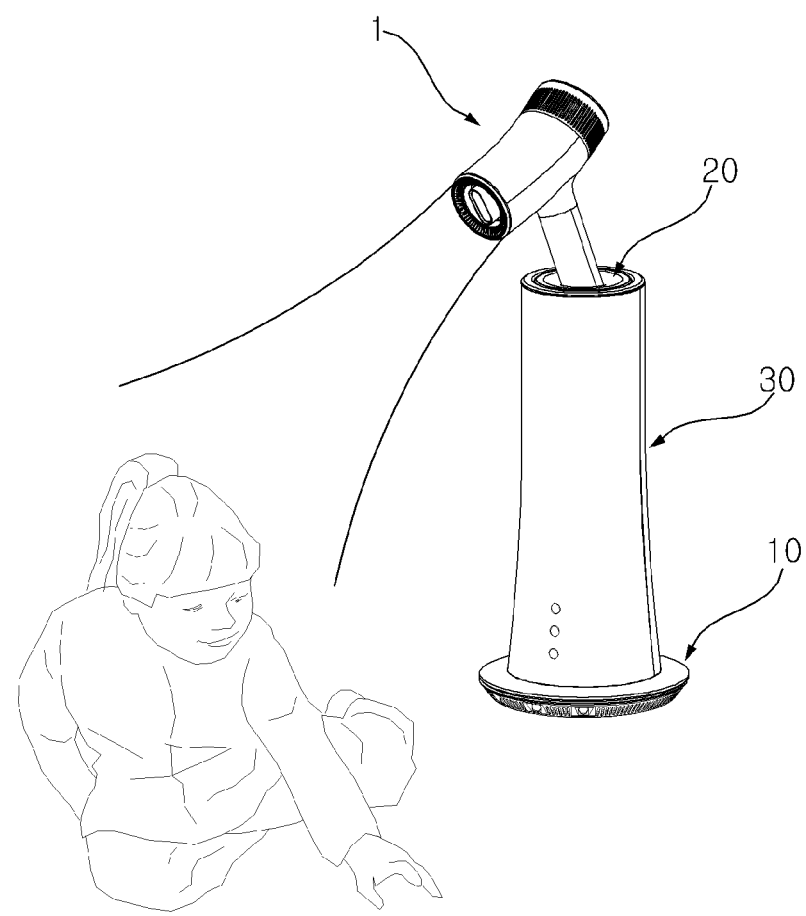
FIG. 14 is a use state diagram of a dryer stand according to an embodiment of the present disclosure.
Figure 15:
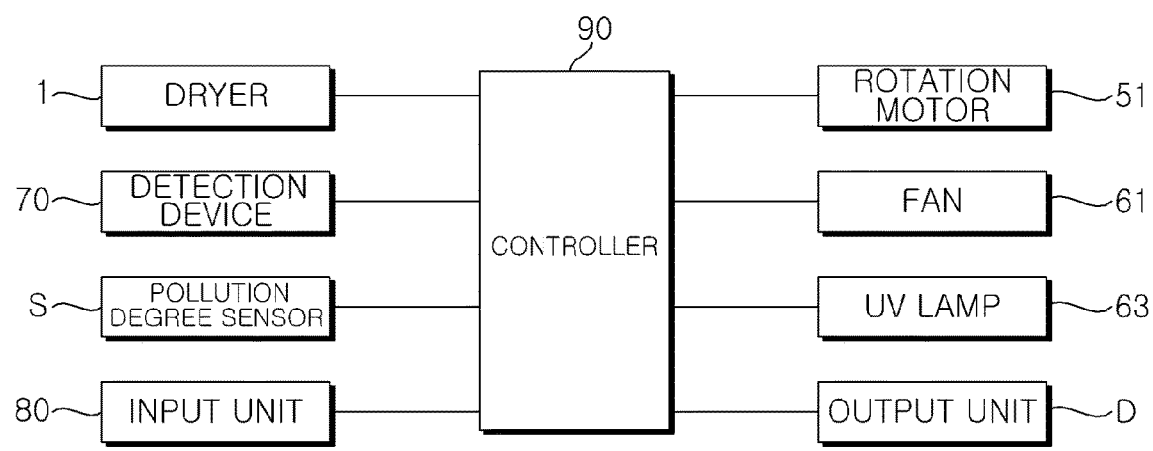
FIG. 15 is a control system diagram of a dryer stand according to an embodiment of the present disclosure.

FIG. 10 is an exploded perspective view of an upper side of a dryer stand according to an embodiment of the present disclosure, FIG. 11 is an upper side cross-sectional view showing a state in which a dryer is mounted in a dryer stand according to an embodiment of the present disclosure, FIG. 12A is a longitudinal sectional view of a dryer stand according to an embodiment of the present disclosure as viewed from the rear, FIG. 12B is a longitudinal sectional view of a dryer stand according to an embodiment of the present disclosure as viewed from the front, FIG. 13 is a perspective view of a receptacle and an upper body of a dryer stand according to an embodiment of the present disclosure, FIG. 14 is a use state diagram of a dryer stand according to an embodiment of the present disclosure, and FIG. 15 is a control system diagram of a dryer stand according to an embodiment of the present disclosure.

The dryer 1 is an apparatus which performs drying with respect to a drying target, such as a person or a companion animal, by using the drying air discharged through a discharge port 3. As described above, the present disclosure relates to a stand on which the dryer 1 is mounted. Meanwhile, the dryer 1, as shown in FIG. 11, may include a rechargeable battery built in therein so that user may carry and can perform drying for the drying target.

As described above, the stand includes the base 10, the receptacle 20, and the body 30. The receptacle 20 may accomplish at least one of a tilting operation and a rotating operation in the left-right direction.

The tilting operation refers to rotation of the receptacle 20 (and a dryer, in mounted therein) in the front-rear direction, that is, the rotation about the Y axis. Rotation in the left-right direction means the rotation about the Z axis, which may also be an axis of the body 30. However, an axis which becomes the center of the tilting operation in response to the rotation in the left-right directions of the receptacle 20 may be changed to any one axis on the XY plane.

As described above, the body 30 may include side body 31, 32 having the upper body 34, the front body 31, and the rear body 32. Further, as shown in FIGS. 5 and 7B, the body 30 may further include an inner body 33, and the inner body 33 may be coupled to the inner surface of the rear body 32. The inner body 33 may be detachably coupled to the rear body 32 by a screw fastening method, a snap fit fastening method using a snap protrusion-groove, and/or a welding method.

When the inner body 33 is provided, the rear body 32 may be removed from the stand to access the air purifier which requires periodic replacement and management. It may not be necessary to remove the rear body 32 and the inner body 33 to access the rotation motor 51, the power transmission mechanism 40, and the receptacle 20, depending on the configuration of the stand.

As shown in FIGS. 10 and 11, the receptacle 20 includes tubs 21, 22 that form a groove 20a into which at least some portion of the grip 2 of the dryer 1 is inserted, and the tubs 21 and 22 may include an upper tub 21 and a lower tub 22. As an example, the upper tub 21 may be formed in an approximately hemispherical shape having a wide upper side and a narrow lower side, and the lower tub 22 may be formed in an approximately cylindrical shape. The upper tub 21 and the lower tub 22 may be integrally formed.

As shown in FIGS. 10 and 11, a terminal hole 221 through which an electrode terminal for charging a battery built in the dryer 1 penetrates may be formed on a bottom surface of the lower tub 22. In addition, a lower surface of the lower tub 22 may be formed with a cable hole (not shown) through which a cable for electrical communication between the dryer 1 and the respective components of the stand may be provided.

The groove 20a may be formed with a guide groove 21a into which a guide rib formed in a grip 2 of the dryer 1 is inserted. Thus, it is easy to fix the grip 2 of the dryer 1 to the receptacle 20, thereby preventing the grip 2 from being separated from the receptacle 20 between the tilting operation of the receptacle 20 and/or the rotation operation in the left-right directions.

In addition, the guide rib and the guide groove 21a may easily guide the dryer 1 to be fixed to the receptacle 20 in a proper position (e.g., a position where the discharge port 3 of the dryer 1 is directed forward). Alternatively, in some embodiments, the grip 2 of the dryer 1 and the receptacle 20 may be provided with fixing means such as a magnet, so that the grip 2 may be fixed in the receptacle in a correct position.

As shown in FIGS. 10, 12A, 12B and 13, the stand according to the embodiment of the present disclosure is a configuration for the tilting operation of the receptacle 20. The stand may include a tilting pin 211 and a pin mount 341, 342.

The tilting pin 211 may extend toward the outside from the outer surface of the receptacle 20 so that it may become a center of the tilting operation of the receptacle 20. As an example, the tilting pin 211 may be integrally formed on the outer surface of the upper tub 21.

In addition, as shown in FIG. 10, the tilting pin 211 may be a pair of tilting pins spaced 180 degrees from each other in the left-right directions. That is, the tilting pin 211 may be provided as a pair of tilting pins 211 so that the tilting operation of the receptacle 20 is stably performed. However, in some embodiments, the tilting pin 211 may be provided as a single tilting pin, and in this arrangement, the other side opposite of the receptacle 20 to the one side on which the tilting pin is formed may be fixed to be rotatable using other means.

As shown in FIG. 10, the pin mount 341, 342 may have one side coupled to the upper body 34, and an insertion hole into which the tilting pin 211 is inserted may be formed, so that the tilting pin 211 can be rotatably supported. The pin mount 341, 342 may include an upper mount 341 (first mount) and a lower mount 342 (second mount). The one side of the upper mount 341 may be coupled to the upper body 34, and the lower mount 342 may be detachably coupled to the upper mount 341 across the tilting pin 211. As an example, the upper mount 341 and the lower mount 342 may be screw fastened.

When the upper mount 341 and the lower mount 342 are coupled to each other, the insertion hole is formed between these components, and the tilting pin 211 may be inserted into the insertion hole. Thus, the receptacle 20 may be coupled to the upper body 34 through the tilting pins 211 and the pin mount 341, 342.

The receptacle 20 according to the embodiment of the present disclosure may be rotated in the front-rear direction (i.e., rotated about the Y axis) while the tilting pin 211 is inserted into the insertion hole formed in the pin mount 341, 342, so that the tilting operation can be performed. As a result, as shown in FIG. 14, the air discharge direction of the dryer 1 mounted in the receptacle 20 can be shifted in the front-rear direction.

As shown in FIGS. 12A, 12B, and 13, the stand according to the embodiment of the present disclosure may further include a tilting guide 212. The tilting guide 212 may be a member for stably performing a rotation operation (i.e., tilting operation) of the tilting pin 211 in cooperation with the pin mounts 341, 342.

The tilting guide 212 may be interposed between the outer surface of the receptacle 20 and the inner surface of the pin mount 341, 342. As an example, the tilting guide 212 may extend from the outer surface of the tilting pin 211 and be disposed between the upper tub 21 and the inner surface of the pin mount 341, 342.

The tilting guide 212 may be formed to be parallel to the inner surface of the pin mount 341, 342 and be orthogonal to the central axis of the tilting pin 211, and as an example, may be formed in a semicircular shape. That is, the surface of the tilting guide 212 contacting the pin mount 341, 342 is orthogonal to the central axis of the tilting pin 211, so that even if the outer shape of the upper tub 21 is curved, the rotation operation (i.e., the tilting operation) of the tilting pin 211 based on the pin mount 341, 342 can be stably performed.

Meanwhile, after the tilting operation of the receptacle 20 according to the user operation (for example, operation by applying a force to the dryer 1 in the desired tilting direction in the state in which the grip 2 of the dryer 1 is inserted into the groove 20a), it may be necessary to configure the position of the receptacle 20 to be fixed and maintained.

Thus, as shown in FIG. 13, in the stand according to an embodiment of the present disclosure, at least one protrusion 211a, which may be made of an elastic material, is formed on the outer circumferential surface of the tilting pin 211, and a plurality of seating grooves 341a and 342a in which the protrusion 211a is seated may be formed on the inner circumferential surface of the pin mount 341, 342.

FIG. 13 illustrates that the protrusion 211a is a pair of protrusions that are spaced 180 degrees apart from each other in the vertical direction. However, the present disclosure is not limited thereto, and the protrusion 211a may be provided as a single protrusion or as three or more protrusions.

In addition, FIG. 13 illustrates that the seating groove 341a, 342a is formed in the upper mount 341 and the lower mount 342, respectively, but is not limited thereto and obviously may be formed differently according to the number and position of the protrusion 211a. The plurality of seating grooves 341a and 342a may be disposed to be spaced apart from each other at certain intervals, in an area corresponding to the rotation trajectory of the protrusion 211a according to the tilting operation of the receptacle 20.

The shape of the protrusion 211a and the seating groove 341a, 342a is not particularly limited in the present disclosure, but a shape that allows the protrusion 211a not to be separated from the seating groove 341a, 342a unless a certain force is applied is sufficient.

When the force transmitted to the protrusion 211a through the receptacle 20 and the tilting pin 211 is less than a certain value, the protrusion 211a may be maintained in the seating groove 341a, 342a, so that the position of the receptacle 20 can be fixed and maintained. If the force transmitted to the protrusion 211a through the receptacle 20 and the tilting pin 211 is greater than or equal to the certain value, the protrusion 211a may be separated and move away from the seating groove 341a, 342a, so that a tilting operation of the receptacle 20 may be performed to change the position of the receptacle 20. That is, because the protrusion 211a may be formed of an elastic material, when a certain force is applied, the length and/or shape may be changed. If the force is removed, the protrusion 211a may be restored to an original length and/or original shape.

Thus, when a force equal to or greater than the certain value is applied to the protrusion 211a seated in the seating groove 341a, 342a, the protrusions 211a may gradually decrease in volume and be separated from the seating groove 341a, 342a. As a result, the tilting operation of the receptacle 20 may be performed. Thereafter, when the force applied to the protrusion 211a falls below the certain value, the protrusion 211a gradually increases in volume and may be seated in the adjacent seating groove 341a, 342a and maintained to be seated. Thus, the position of the receptacle 20 may be fixed and maintained. In this case, the user may feel a sense of engagement/disengagement as the protrusion 211a is separated from/seated in the plurality of seating grooves 341a and 342a, thereby providing useful feedback to the user.

As shown in FIGS. 10 and 11, the stand according to the embodiment of the present disclosure is a configuration for the rotation operation in the left-right direction of the receptacle 20, and may include the rotation motor 51 and the power transmission mechanism 40. In this case, the receptacle 20 may be rotated in the left-right directions according to the rotation of the rotation motor 51 in the forward and reverse directions, which will be described in more detail below.

The rotation motor 51 is electrically driven and may be detachably coupled to the front body 31 through the motor mount 511. As an example, the motor mount 511 and the front body 31 may be screw fastened. In this arrangement, the rotation motor 51 may be a servo motor that can adjust the rotation angle stepwise in response to a control signal. Thus, the rotation angle of the receptacle 20 in the left-right direction can be adjusted stepwise.

According to the embodiment, the stand may further include a reduction unit for reducing the rotational speed of the rotation motor 51.

The power transmission mechanism 40 may control the transmission of the power of the rotation motor 51 to the receptacle 20. The power transmission mechanism 40 may include a link block 41, a rotating body 43, and a connector 45. As shown in FIGS. 10 and 11, a rotation shaft 52 of the rotation motor 51 may be connected to the link block 41. The link block 41 may be formed by integrally combining two blocks having different diameters.

Among the blocks constituting the link block 41, the rotation shaft 52 of the rotation motor 51 may be directly connected to a block having a relatively small diameter, and a block having a relatively large diameter may be coupled to an upper side of the block having the relatively small diameter.

In addition, the stand according to the embodiment of the present disclosure may be provided with a bearing member 53 to rotatably support the link block 41. Among the blocks constituting the link block 41, the bearing member 53 may be disposed outside the block having the relatively large diameter to stably support rotation of the link block 41, rotation motor 51, rotating body 43 and connector 45. In this arrangement, the block having a relatively large diameter among the blocks constituting the link block 41 may have a plurality of protruding ribs formed on an outer side surface thereof, and the plurality of protruding ribs may contact the bearing member 53.

The bearing member 53 may be one or more of various bearings, such as a ball bearing and a roller bearing, and the bearing member 53 may be detachably coupled to the front body 31 through the bearing mount 531. As an example, the bearing mount 531 and the front body 31 may be screw fastened.

As shown in FIGS. 10 and 11, the rotating body 43 may be coupled to the link block 41 to rotate together when the link block 41 rotates. The rotating body 43 may include a central rotating body 43a, an outer rotating body 43c, and a bridge 43b. The central rotating body 43a may be connected to the link block 41 and may be formed, for example, as a hollow cylinder.

The outer rotating body 43c may be disposed to be spaced apart from the outer surface of the central rotating body 43a by a certain distance. One side of the outer rotating body 43c may be coupled to the connector 45. The outer rotating body 43c may be formed, for example, as a hollow cylinder and may have a diameter (width) larger than the diameter (width) of the central rotating body 43a.

The bridge 43b may connect the central rotating body 43a and the outer rotating body 43c. The bridge 43b may extend outward from the outer surface of the central rotating body 43a and may be coupled to the inner surface of the outer rotating body 43c. The bridges 43b may be a plurality of bridges, each of which is spaced by a certain interval (rotational angle).

When the central rotating body 43a and the outer rotating body 43c are formed in the shape of a hollow cylinder, and the plurality of bridges 43b connect the central rotating body 43a to the outer rotating body 43c, several advantages may be achieved. For example, when the rotating body 43 is configured as described above, in comparison with a differently configured rotating body (i.e., solid rotating body), the rotating mass of the rotating body may be reduced so that the rotation of the power transmission mechanism 40 can be accomplished easier. In addition, it may be advantageous in reducing the cost for the production of the rotating body 43 or in lightening the stand.

As shown in FIGS. 10 and 11, the connector 45 may accommodate at least a part of the receptacle 20 therein. One side of the connector 45 may be coupled to the rotating body 43 or the outer rotating body 43c, and the other side may be coupled to the upper body 34. By screw threading between a fastening protrusion 453 formed in one end of the connector 45 and a fastening protrusion 343 formed in one end of the upper body 34, the connector 45 and the upper body 34 can be detachably coupled.

As described above, the receptacle 20 is coupled to the upper body 34 via the tilting pin 211 and the pin mount 341 and 342, and the connector 45 is coupled to the upper body 34, so that the receptacle 20 may be coupled to the connector 45 via the upper body 34. In this case, the upper body 34 may be rotatably supported by the side body 31, 32. Thus, the power of the rotation motor 51 can be transmitted to the receptacle 20 through the power transmission mechanism 40 and the upper body 34, so that the receptacle 20 can be rotated in the left-right direction according to the rotation in the forward and reverse direction of the rotation motor 51. As a result, as shown in FIG. 14, the air discharge direction of the dryer 1 mounted in the receptacle 20 can be shifted in the left-right direction.

As shown in FIG. 10, the connector 45 may have a space, corresponding to the trajectory of the tilting operation of the receptacle 20, which is partitioned therein, and a certain space 454, corresponding to the space where the tilting pin 211 and the pin mount 341, 342 are disposed, may be formed at one side thereof. Thus, in the receptacle 20, the tilting operation and the rotation in the left-right direction may be performed independently so that the tilting operation and the rotation operation may be performed simultaneously or separately.

In addition, by simplifying the structure for simultaneously performing the tilting operation and the rotation operation in the left-right direction of the receptacle 20, the stand can be designed and manufactured more compact.

The connector 45 may serve as a stopper for restricting the tilting operation of the receptacle 20 to a certain range by coming into contact with the receptacle 20 or the lower tub 22.

The connector 45 may have a plurality of ribs 451, formed on an inner surface of the connector 45, disposed side by side on a central axis of the rotation operation of the receptacle 20.

As described above, the plurality of ribs 451 may help the connector 45 having a space for accommodating the receptacle 20 therein to more stably rotate in the left-right directions.

According to an embodiment, the plurality of ribs 451 may serve as a stopper that restricts the tilting operation of the receptacle 20 to a certain range by contact with the receptacle 20 or the lower tub 22.

As shown in FIGS. 6 and 15, the stand according to an embodiment of the present disclosure may include a controller 90. The controller 90 may be accommodated inside the base 10. The controller 90 may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units for performing other functions.

As shown in FIG. 15, the controller 90 may control the operation of the rotation motor 51. The controller 90 may automatically control the rotation operation of the receptacle 20 in the left-right direction by adjusting the rotation direction and the rotation angle of the rotation motor 51 based on the information on the drying target (e.g., information on the position and size of the drying target) detected by the detection device 70.

As shown in FIG. 15, the controller 90 may receive information on pollution degree of the ambient air from a pollution degree sensor S provided in the stand, and may control whether the fan 61 and/or the ultraviolet generator 63 (e.g., a UV lamp) operates depending on the degree of pollution.

As shown in FIG. 4, the input unit 80 may include a button housing 81 and a plurality of buttons 82a, 82b, and 82c installed in the button housing 81, and each of the plurality of buttons 82*a*, 82*b*, and 82*c* may include a first button 82*a*, a second button 82*b*, and a third button 82*c* that perform different functions.

As shown in FIGS. 3 to 5, the input unit 80 may be detachably coupled to the front body 31 by screw fastening, or the like. The front body 31 may be formed with a plurality of button holes 31*a*, 31*b*, 31*c* into which each of the plurality of buttons 82*a*, 82*b*, and 82*c* is inserted. Thus, a plurality of buttons 82*a*, 82*b*, and 82*c* are partially exposed on the front surface of the front body 31 so that the user can operate the button.

As an example, the first button 82*a* may be a button for rotating the receptacle 20 in the left-right direction, and may be a button for issuing a signal to the controller 90 to control the rotation direction and the rotation angle of the rotation motor 51. To this end, the controller 90 may be electrically connected to the first button 82*a* and the rotation motor 51.

For example, the second button 82*b* may be a button for discharging hot air or lukewarm air from the discharge port 3 of the dryer 1 mounted in the receptacle 20, and may be a button for issuing a signal to the controller 90 to control the operation of the heater that heats the air introduced into the dryer 1. To this end, the controller 90 may be electrically connected to the second button 82*b* and the heater of the dryer 1.

As an example, the third button 82*c* may be a button for purifying indoor air through the air purifier, and may be a button for issuing a signal to the controller 90 to control the operation of the fan 61 and the ultraviolet generator 63. To this end, the controller 90 may be electrically connected to the third button 82*c*, the fan 61, and the ultraviolet generator 63.

According to the embodiment, when the discharge port 3 of the dryer 1 is rotatably provided by a discharge port rotation motor built in the dryer 1, the stand may further include a fourth button. In such an arrangement, the fourth button may be a button for rotating the discharge port 3, and may be a button that issues a signal to the controller 90 to control the rotation of the discharge port rotation motor. To this end, the controller 90 may be electrically connected to the fourth button and the discharge port rotation motor.

The number of buttons provided in the input unit 80 described above and the function of each button are just an example, but are not limited thereto.

As shown in FIGS. 6 and 9, the stand according to an embodiment of the present disclosure may supply power to various components requiring power, such as the rotation motor 51, the fan 61, the ultraviolet generator 63, and the controller 90, through a power cable penetrating a power supply hole 123 formed in one side of the base 10.

In addition, according to an embodiment, a separate battery may be built in the stand to supply power to a configuration to various components requiring power in the stand. Such a battery may be charged by an external power source applied through the power cable.

The battery built in the dryer 1 mounted in the receptacle 20 may be charged through an external power source applied through the power cable and an electrode terminal passing through the terminal hole 221.

As shown in FIG. 15, the stand according to the embodiment of the present disclosure may include an output unit (D). The output unit D may be a display for displaying to the user whether a function of the stand is being performed by the stand. For example, the output unit D may display information such as the remaining power of the battery built in the dryer 1, the discharge of hot air or lukewarm air from the discharge port 3 of the dryer 1, the rotation operation of the discharge port of the dryer 1, the tilting or rotation angle in the left-right direction of the receptacle 20, the pollution degree of ambient air, and operation of the air purifier.

According to the present disclosure, one or more of the following effects may be achieved.

First, since the dryer may be mounted in the receptacle, the user can dry the drying target without holding the dryer.

Second, the receptacle can be tilted so that the discharge direction of the drying air can be shifted in the front-back direction according to the position and size of the drying target. To this end, the tilting pin formed on the outside of the receptacle is rotatably supported by a pin mount coupled to the upper body, so that the receptacle can be tilted with respect to the upper body.

Third, the receptacle can be tilted when a certain force is applied, so that the position of the receptacle can be fixed and maintained when it is not necessary to change the discharge direction of the drying air. To this end, the protrusion formed in the tilting pin may be formed of an elastic material whose shape changes according to an applied force, and may be seated in or detached from a seating groove formed in the pin mount. Here, when the protrusion is separated from the seating groove, the receptacle is tilted, and when the protrusion is seated in the seating groove, the position of the receptacle may be fixed and maintained.

Fourth, a surface in contact with the tilting guide formed on the tilting pin and the pin mount may be orthogonal to the central axis of the tilting pin, so that the tilting operation of the receptacle can be performed stably.

Fifth, since the receptacle is provided to be rotatable in the left-right direction, the discharge direction of the drying air can be shifted toward the left-right direction according to the position and size of the drying target. To this end, the power of the rotation motor is transmitted to the receptacle by the power transmission mechanism, so that the receptacle can be rotated in the left-right direction according to the rotation of the rotation motor.

Sixth, by forming a plurality of ribs disposed in the left-right rotation shaft side by side in the connector for accommodating the receptacle therein, the left-right rotation operation of the receptacle can be performed stably.

Seventh, since the rotating body that serves as the connection between the connector and the link block connected to the rotation motor among the power transmission mechanism may be formed as a hollow shape, the left-right rotation operation of the receptacle is smoother in comparison with a solid type rotating body, and the production cost can be reduced and the weight of the stand can be reduced.

Eighth, the guide groove, into which the guide rib formed in the dryer is inserted, may be formed in the receptacle so that the dryer may be prevented from being separated from the receptacle during the tilting operation and/or the left-right rotation operation of the receptacle.

Ninth, the receptacle can be tilted and rotated in the left-right direction, so that the discharge direction of the drying air can be shifted simultaneously with or separately from the front-rear direction and the left-right direction according to the position and size of the drying target. To this end, the receptacle, which may be coupled to the upper body to be tiltable, may be rotated together when the upper body is rotated in the left-right directions.

Tenth, since a space corresponding to the trajectory of the tilting operation of the receptacle is formed in the power transmission mechanism for accommodating the receptacle therein, the structure for simultaneously performing the tilting operation and the left-right rotation operation of the receptacle can be simplified.

Although the exemplary embodiments of the present disclosure have been disclosed for illustrative purposes, those skilled in the art will appreciate that various modifications, additions and substitutions are possible, without departing from the scope and spirit of the disclosure as disclosed in the accompanying claims. Accordingly, the scope of the present disclosure is not construed as being limited to the described embodiments but is defined by the appended claims as well as equivalents thereto.

What is claimed is:

1. A dryer stand, comprising:
   a base;
   a body having a first end connected to the base and a second end spaced upward from the base; and
   a receptacle located in the second end of the body, the receptacle being mounted to the second end of the body such that the receptacle is tiltable relative to the base, the receptacle being configured to receive a dryer therein for discharging drying air,
   wherein the body comprises:
      an upper body adjacent to an upper side of the receptacle at the second end of the body; and
      a side body forming a side shape of the dryer stand and disposed between the upper body and the base,
   wherein the dryer stand further comprises:
      a first tilting pin extending outward from an outer surface of the receptacle and defining an axis of rotation for tilting of the receptacle; and
      a first pin mount coupled to the upper body and having an insertion hole into which the first tilting pin is inserted so that the first tilting pin is rotatably supported, and
   wherein the receptacle is accommodated in the body at a certain height upward from the base.

2. The dryer stand of claim 1, further comprising a second tilting pin extending outward from the outer surface of the receptacle, the second tilting pin being spaced 180° apart from the first tilting pin on the outer surface of the receptacle.

3. The dryer stand of claim 1, wherein the first tilting pin has at least one protrusion on an outer circumferential surface of the tilting pin, the protrusion being an elastic material, and
   wherein the first pin mount has a plurality of seating grooves on an inner circumferential surface of the insertion hole, each seating groove configured to receive the at least one protrusion based on the tilting of the receptacle relative to the base.

4. The dryer stand of claim 3, wherein each of the plurality of seating grooves is spaced apart from each other at a certain interval in an area corresponding to a rotation trajectory of the protrusion according to the tilting of the receptacle relative to the base.

5. The dryer stand of claim 1, wherein the first pin mount comprises:
   a first mount having one side coupled to the upper body; and
   a second mount detachably coupled to the first mount,
   wherein each of the first and second mounts have a recessed portion such that when the second mount is coupled to the first mount, the recessed portions define the insertion hole.

6. The dryer stand of claim 5, wherein the first mount is disposed above the second mount relative to the base.

7. The dryer stand of claim 1, further comprising a tilting guide interposed between the outer surface of the receptacle and the inner surface of the first pin mount, the tilting guide being parallel to an inner surface of the first pin mount and orthogonal to a central axis of the tilting pin.

8. A dryer stand, comprising:
   a base;
   a body having a first end connected to the base and a second end spaced upward from the base, the body defining an axis; and
   a receptacle located in the second end of the body, the receptacle being mounted to the second end of the body such that the receptacle is rotatable about the axis, the receptacle being configured to receive a dryer therein for discharging drying air,
   wherein the receptacle comprises a groove configured to receive a grip of the dryer inserted therein, and
   wherein the groove comprises a guide groove into which a guide rib formed in the grip of the dryer is insertable.

9. The dryer stand of claim 8, further comprising:
   a rotation motor; and
   a power transmission mechanism coupled to the rotation motor and the receptacle to transmit rotation of the rotation motor to the receptacle.

10. The dryer stand of claim 9, wherein the receptacle is rotatable in a clockwise-counterclockwise direction in response to a forward-reverse direction of the rotation motor.

11. The dryer stand of claim 9, wherein the rotation motor is a servo motor that adjusts a rotation angle of the receptacle in response to a control signal.

12. The dryer stand of claim 11, wherein the rotation motor includes a rotatable shaft, and
   wherein the power transmission mechanism comprises:
   a link block connected to the rotation shaft of the rotation motor;
   a rotating body coupled to the link block to rotate with the link block when the link block rotates; and
   a connector accommodating at least a portion of the receptacle therein, the connector having a first side coupled to the rotating body and a second side coupled to the receptacle.

13. The dryer stand of claim 11, wherein the connector has an inner surface, and a plurality of ribs formed at the inner surface, and
   wherein the ribs are radially disposed about the axis of the body.

14. The dryer stand of claim 11, wherein the rotating body comprises:
   a central rotating body connected to the link block, the central rotating body having an outer surface;
   an outer rotating body spaced apart from the outer surface of the central rotating body, the outer rotating body having a first side coupled to the connector; and
   a plurality of bridges extending between the central rotating body and the outer rotating body to connect the central rotating body to the outer rotating body.

15. A dryer stand, comprising:
   a base;
   a body having a first end connected to the base and a second end spaced upward from the base, the body defining an axis; and
   a receptacle located in the second end of the body, the receptacle being mounted to the second end of the body such that the receptacle is rotatable about the axis and is tiltable relative to the base, the receptacle being configured to receive a dryer therein for discharging drying air, wherein the dryer stand further comprises a power transmission mechanism inside the body, the power transmission mechanism transmitting power to the receptacle to rotate the receptacle in the clockwise-counterclockwise direction about the axis of the body, and wherein the power transmission mechanism accommodates at least a portion of the receptacle therein, the power transmission mechanism having a space corresponding to a trajectory of the tilting of the receptacle.

16. The dryer stand of claim 15, wherein the body includes:

an upper body, the upper body being adjacent to an upper side of the receptacle at the second end of the body; and a side body being disposed between the upper body and the base, and wherein the receptacle is coupled to the upper body so as to be tiltable relative to the upper body and rotatable with the upper body when the upper body is rotated in a clockwise-counterclockwise direction about the axis of the body.

\* \* \* \* \*